United States Patent
Feuser

(10) Patent No.: US 7,136,892 B2
(45) Date of Patent: Nov. 14, 2006

(54) METHOD FOR MULTIPLYING TWO FACTORS FROM THE GALOIS FIELD AND MULTIPLIER FOR PERFORMING THE METHOD

(75) Inventor: Markus Feuser, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 742 days.

(21) Appl. No.: 10/324,766

(22) Filed: Dec. 20, 2002

(65) Prior Publication Data

US 2003/0140078 A1   Jul. 24, 2003

(30) Foreign Application Priority Data

Dec. 29, 2001 (DE) ................................ 101 64 416

(51) Int. Cl.
G06F 7/72 (2006.01)
(52) U.S. Cl. .................................................... 708/492
(58) Field of Classification Search ................. 708/492
See application file for complete search history.

(56) References Cited

U.S. PATENT DOCUMENTS

| | | | |
|---|---|---|---|
| 5,999,959 A * | 12/1999 | Weng et al. ................. | 708/492 |
| 6,609,142 B1 * | 8/2003 | Liardet ........................ | 708/492 |
| 6,701,336 B1 * | 3/2004 | Shen et al. .................. | 708/492 |
| 6,766,344 B1 * | 7/2004 | Dubey et al. ............... | 708/492 |
| 6,766,345 B1 * | 7/2004 | Stein et al. .................. | 708/492 |
| 2001/0054053 A1 * | 12/2001 | Lambert et al. ............. | 708/492 |
| 2003/0093450 A1 * | 5/2003 | Chen .......................... | 708/492 |
| 2003/0135530 A1 * | 7/2003 | Parthasarathy et al. ..... | 708/492 |

* cited by examiner

*Primary Examiner*—D. H. Malzann
(74) *Attorney, Agent, or Firm*—Kevin Fortin

(57) ABSTRACT

The invention relates to a method and multiplier for multiplying two factors from the Galois field GF $(2^{m*p})$, where each of the factors can be represented as a vector of p sub-blocks with a width of m bits and p, m are positive integers greater than 1. The method and multiplier allow for a polynomial multiplication to be performed quickly and efficiently with minimum requirements in respect of for storage space. Therefore, savings can thus be achieved in respect of power consumption, crystal surface and calculation time.

2 Claims, 2 Drawing Sheets

Figure 1:
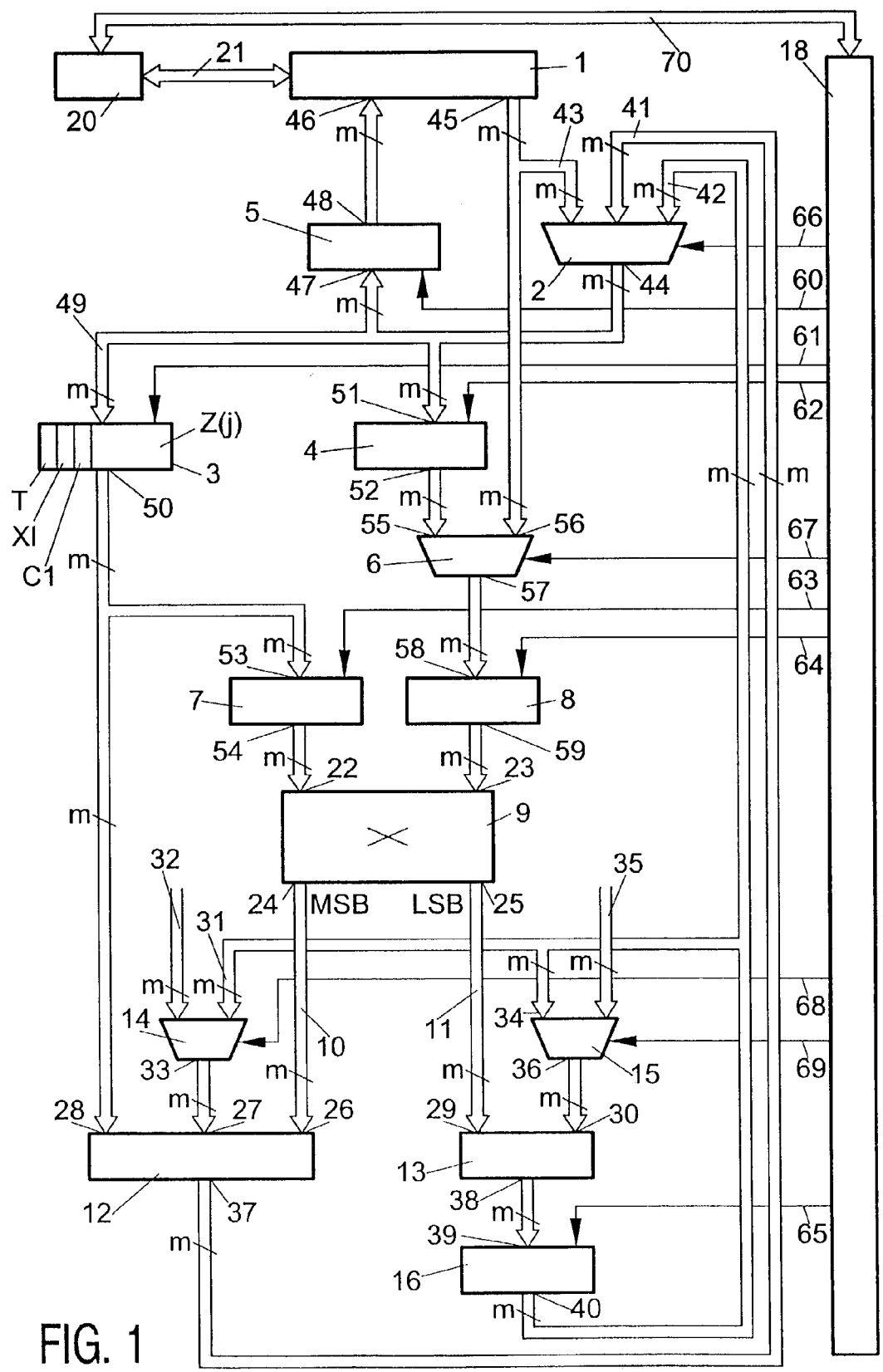

METHOD FOR MULTIPLYING TWO FACTORS FROM THE GALOIS FIELD AND MULTIPLIER FOR PERFORMING THE METHOD

The invention relates to a method for multiplying two factors from the Galois field GF ($2^{m*p}$), where each of the factors can be represented as a vector of p sub-blocks with a width of m bits and p, m are positive integers greater than 1. The invention further relates to a multiplier for performing the method.

Elliptical curves have proved suitable for the performance of cryptographic methods with public keys. The advantages of elliptical curves in cryptography is that with comparable security, the length of public keys can be kept substantially shorter than the length of keys when using the so-called RSA method. This saves memory space and increases the data throughput on encryption as this throughput generally diminishes as the key length increases.

International patent application WO 96/30828 discloses a finite field multiplier for a field $GF2^{mn}$ formed from a pair of m-cell shift registers and an m-cell accumulation cell. This multiplier comprises logic links to generate grouped terms in the cells concerned of the accumulation cell for retention of the vector of the subfield elements in each shift register. Each cell contains a subfield element in the form of a number of n subcells which each store a binary figure. The logic links perform arithmetic operations in accordance with the inherent subfield arithmetic in order to generate a subfield element of n binary figures in each cell of the accumulation register. This multiplier aims to give a product of two vectors in a number of m clock cycles. Mapping between individual registers can give the squaring of a vector within a clock cycle.

On multiplication of two dual figures, a result of double length is achieved, i.e. double the number of bits. On multiplication of figures of greater length, as required for encryption, results of very great length are thus produced which require very much memory space.

The multiplication of elements from the Galois field differs from the multiplication of integral dual figures in that on multiplication of integers in conventional microprocessors, a residual class ring is used whereas the Galois field is a mathematical body. Multiplication in the Galois field can be performed on normal and on polynomial basis. The latter is also the basis for the function of the multiplier shown in international patent application WO 96/30828. Such a multiplication on polynomial basis, referred to below in brief as polynomial multiplication, is very time-consuming and very inefficient when performed on conventional microprocessors. If, moreover, such polynomial multiplication is required very frequently in an encryption process, this leads to an undesirable delay in the execution of the encryption process.

The object of the invention is to provide a method and a multiplier with which the said polynomial multiplication can be performed quickly and efficiently with minimum requirements in respect of for storage space.

To achieve this object the method according to the invention for multiplying two factors from the Galois field includes the following steps:

a) selection of a reduction polynomial comprising a leading bit other than zero and p subsequent sub-blocks of m bits each, of which the r lease-significant sub-blocks of m bits each can be selected as arbitrarily not equal to the zero vector and the other sub-blocks as zero, r being a positive integer less than p, and storing the r least-significant sub-blocks of the reduction polynomial in a first register, b) multiplicative linking of a sub-block of the first factor, starting with the most-significant sub-block of the first factor with in succession all sub-blocks of the second factor, starting with the most-significant sub-block of the second factor, c) digit-aligned accumulation of all intermediate results of the multiplicative linking of the sub-blocks of the first and second factors according to an exclusive-OR function without carry, d) where, after each multiplicative linking of a sub-block of the first factor to a sub-block of the second factor, at the latest after accumulation of the intermediate results of the multiplicative links of one sub-block of the first factor with all sub-blocks of the second factor, a reduction of the possibly accumulated intermediate result is performed to a width of m bits while using the reduction polynomial in the following steps:

d1) provision of the intermediate result to be reduced, d2) provision of at least one sub-block of the reduction polynomial, d3) multiplication of the reduction polynomial with the most-significant m bits of the possibly accumulated intermediate result to be reduced, giving a polynomial to be subtracted in which the value of the most-significant bit corresponds to the value of the most-significant bit of the intermediate result to be reduced, d4) subtraction of the polynomial to be subtracted from the intermediate result to be reduced and provision of the result of this subtraction as a new intermediate result to be reduced, d5) repeated execution of the steps d1) to d4) until the intermediate result to be reduced has a width equal to m.

A multiplier according to the invention for multiplying two factors from the Galois field GF ($2^{m \times p}$), where each of the factors can be represented as a vector of p sub-blocks with a width of m bits and p, m are positive integers greater than 1, comprises:

a memory unit for storing the factors to be multiplied of the r least-significant sub-blocks of a reduction polynomial which each comprise m bits, where r is a positive integer less than p, and a reduced final result of the multiplication of the factors, an m*m-bit multiplier stage for multiplicative linking of each time two of the sub-blocks of the factors and for output of a multiplication result with a width of 2 m bits, a first and a second sub-block memory for storage and provision of each time one of the sub-blocks to be linked multiplicatively, a first intermediate result memory for storing at least one intermediate result, a first exclusive-OR link stage for linking the m most-significant bits of each multiplication result according to an exclusive-OR function with a digit-aligned selected intermediate result from the first intermediate result memory and with an element selected via a first multiplexer stage, a second exclusive-OR link stage for linking the m least-significant bits of each multiplication result according to an exclusive-OR function with an element selected via a second multiplexer stage, a second intermediate result memory for storing a link result output by the second exclusive-OR link stage, a reduction polynomial memory for storing and provision of the r least-significant sub-blocks of the reduction polynomial, an output register for temporary storage of one of the link results output by the first or the second exclusive-OR link stage as a sub-block of the reduced end result of the multiplication of the factors to be applied to the memory unit, a third multiplexer stage for applying the link result output by the first or the second exclusive-OR link stage or a selected sub-block from the memory unit optionally to the reduction polynomial memory, to the first intermediate result memory or to the output register, a fourth multiplexer stage for optional supply of a sub-block of the reduction polynomial from the reduction polynomial memory or a sub-block of the second factor from the memory unit to the second sub-block memory, and a control unit to control the said components of the multiplier according to a prespecified functional sequence, where the first multiplexer stage and the second multiplexer stage each select between the current link result of the second intermediate result memory and a zero vector of the same width.

In an advantageous embodiment the multiplier according to the invention has the feature that an input of a memory section dimensioned for the link result output by the first exclusive-OR link stage is connected directly to an output of the first exclusive-OR link stage and an output of this memory section is connected to an input of a fifth multiplexer stage via which optionally the link result output by the first exclusive-OR link stage or another intermediate result from the first intermediate result memory is applied to the first exclusive-OR link stage.

The method according to the invention is based on a polynomial multiplication; the multiplier according to the invention is a polynomial multiplier for n*n bits, where n is the product of the parameters p and m. Preferably, in a microprocessor-controlled arrangement for encryption or decryption of data, such a multiplier can be provided for a microprocessor of conventional structure as an external element whereby the multiplication of factors from the Galois field to be undertaken during encryption or decryption can be performed outside the microprocessor. This allows a considerable acceleration of the encryption or decryption processes. The continuously performed reduction using the reduction polynomial also saves memory space. A core element of the multiplier according to the invention is the m*m-bit multiplier stage also known as the combinatory network. The results of the individual multiplication steps, in total p*p in figures, are summed by the multiplier according to the invention in the Galois field by exclusive-OR link stages.

The invention will be further described with reference to examples of embodiments shown in the drawing to which, however, the invention is not restricted.

Figure 2:
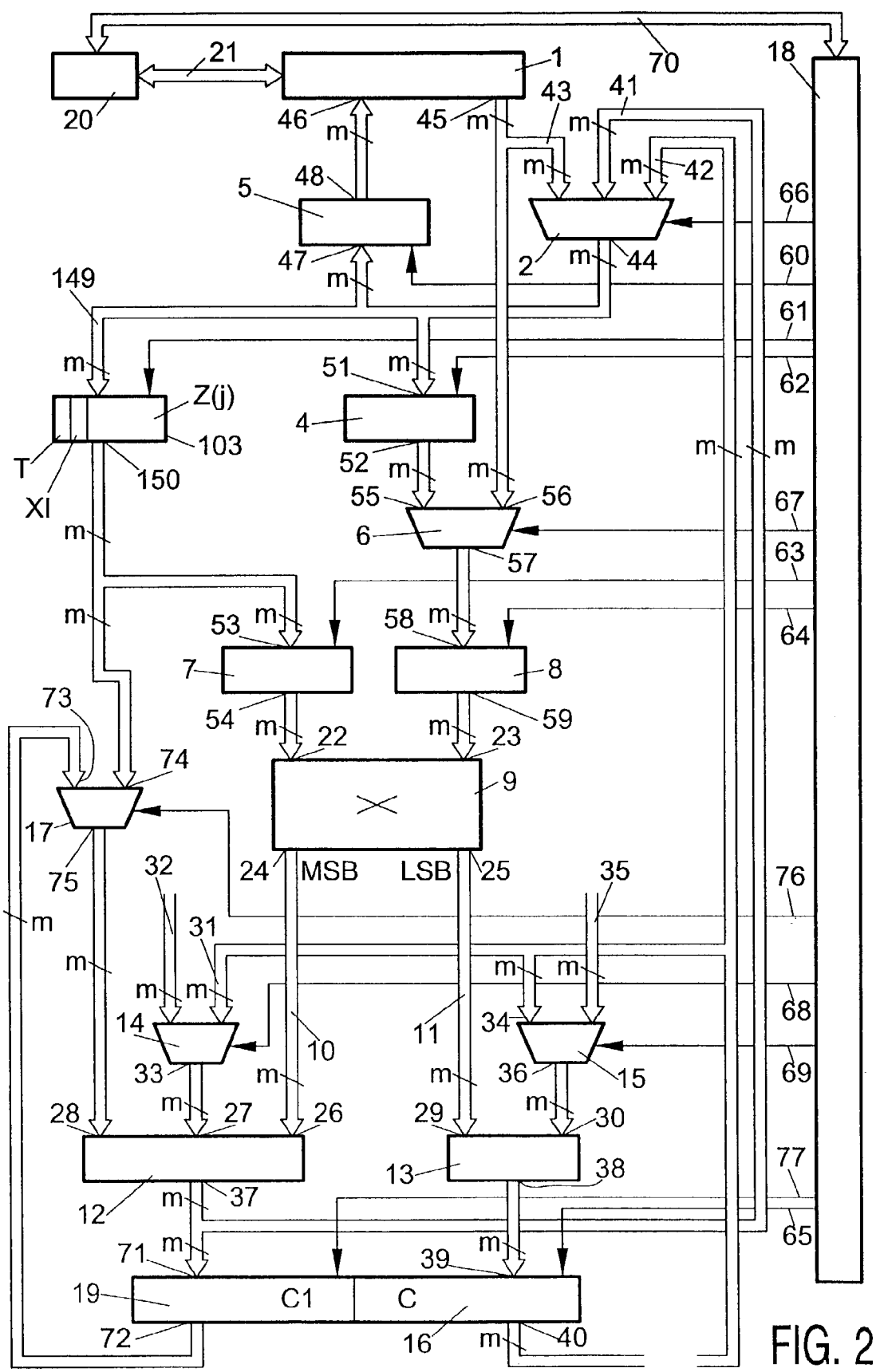

FIG. 1 shows a first embodiment example of a multiplier according to the invention, and FIG. 2 shows a derivation of the embodiment of FIG. 1, corresponding elements being denoted by the same references.

FIG. 1 shows a first embodiment of a polynomial multiplier according to the invention for multiplying two factors represented as binary figures X and Y, each of which has a width of n bits. This polynomial multiplier according to the invention works independently, i.e. without program control by a microprocessor of conventional construction added to the multiplier as an external element, but rather comprises its own control unit 18 for controlling the multiplier according to a specified functional sequence. The polynomial multiplication performed by this multiplier is performed on a polynomial basis. Calculations are performed in individual steps with sub-blocks $X(p), X(p-1) \ldots, X(1)$ of the factor X and $Y(p), Y(p-1), \ldots, Y(1)$ of the factor Y, said sub-blocks each having a width of m bits and the width n of the factors X, Y being an integral multiple, according to a factor p, of the width m, with p=n/m. In a preferred example:

n=192 bits, m=32 bits, p=6.

In the multiplier according to the invention the result of the polynomial multiplication performed is automatically reduced to a width of n bits; for this purpose a reduction polynomial is used as will be described in more detail below.

The reference 1 in FIG. 1 indicates a memory unit preferably formed as a RAM with a word width of m bits, i.e. data stored therein is assembled into sub-blocks of m bits each. Via a connection 21 the memory unit 1 is connected to a central processor unit 20 also known as CPU for data and/or program exchange. Via the central processor unit 20 a program can be executed to process data stored in memory unit 1. For multiplication of two factors from the Galois field, however, the central processor unit 20 is not used. To this end the memory unit 1 instead is directly connected to the arrangement described below.

As a central element this arrangement comprises an m*m-bit multiplier stage 9 for multiplicative linking of each time two sub-blocks of width m, also known as word width m, which are applied to two inputs 22, 23 of the multiplier stage 9. The multiplication result is available at two outputs 24, 25 of multiplier stage 9. The more-significant bits MSB are output at the first output 24 and the less-significant bits LSB at the second output 25 of the multiplier stage 9. The outputs 24, 25 of the multiplier stage 9 also have a word width of m bits. Each of these multiplication results of the total width of 2 m bits is only one of a total number of p*p contributions which are accumulated into the end result of the polynomial multiplication. This accumulation is performed by exclusive-OR link stages, as will be explained below, in the present embodiment of the multiplier according to the invention.

The inputs 22, 23 of the multiplier stage 9 are connected to a first sub-block memory 7 and a second sub-block memory 8, respectively. In the sub-block memories 7, 8 are stored and prepared the sub-blocks of word width m which must be linked together multiplicatively in the multiplier stage 9. The first output 24 of the multiplier stage 9 is connected, via a line 10 for the more-significant bits MSB, to a first input 26 of a first exclusive-OR link stage 12. The second output 25 of the multiplier stage 9 for the less-significant bits LSB is connected, via a line 11, to the first input 29 of the second exclusive-OR link stage 13. These exclusive-OR link stages 12, 13 are used as adders for the polynomial multiplication to be performed.

A second input 27 of the first exclusive-OR link stage 12 is connected to an output 33 of a first multiplexer stage 14. This connection is also dimensioned for a word width of m bits. A second input 30 of the second exclusive-OR link stage 17 is connected, via a connection designed for a word width of m bits, to an output 36 of a second multiplexer stage 15. An output 38 of the second exclusive-OR link stage 17 is connected to an input 39 of a second intermediate result memory 16. This connection too is designed for a word width of m bits. In the second intermediate result memory 16 the link result of the second exclusive-OR link stage 17 is temporarily stored and made available at an output 40 of the second intermediate result memory 16. From the output 40 of the second intermediate result memory 16 a connection for a word width of m bits leads to a first input 31 of the first multiplexer stage 14 and to a first input 34 of the second multiplexer stage 15. A zero vector, i.e. a number of m bits set to zero, is applied to a second input 32 of the first multiplexer stage 14 and to a second input 35 of the second multiplexer stage 15. Depending on the calculation operation to be performed, via the multiplexer stages 14, 15, from the output 40 the intermediate result of the second intermediate result memory 16 or the said zero vector can be applied to the second input 27 and 30 of the exclusive-OR link stages 12 and 12, respectively.

An output 37 of the first exclusive-OR link stage 12 is connected, via a connection with a word width of m bits, to a first input 41 of a third multiplexer stage 2. A second input 42 of the third multiplexer stage 2 is connected to the output 40 of the second intermediate result memory 16. A third input 43 of the third multiplexer stage 2 is connected to a data output 45 of the memory unit 1. Said connections are also designed for a word width of m bits.

From an output 44 of the third multiplexer stage 2 there are connections of a word width of m bits to an input 47 of an output register 5, to an input 49 of the first intermediate result memory 3 and to an input 51 of a reduction polynomial memory 4. The output register 5 is used for the temporary storage of a link result which is supplied either by the first or the second exclusive-OR link stages 12 and 13 via the third multiplexer stage 2. This link result is applied, via the output register 5 and its output 48, to a data input 46 of the memory unit 1 as a sub-block of the reduced end result of the multiplication of the factors of the Galois field. Via the connection between the data output 45 of the memory unit 1 and the third input 43 of the third multiplexer stage 2, a selected sub-block from the memory unit 1 can also be applied to the previously described connection at the output 44 of the third multiplexer stage 2. The signals applied to the third multiplexer stage 2 can be temporarily stored either in the first intermediate result memory 3 or in the reduction polynomial memory 4 or in the output register 5.

From an output 50 of the first intermediate result memory 3 a connection with a word width of m bits leads to a third input 22 of the first exclusive-OR link stage 12 and to an output 53 of the first sub-block memory 7. An output 54 of the first sub-block memory 7 is connected, via a connection for a word width of m bits, to a first input 22 of the multiplier stage 9.

From an output 52 of the reduction polynomial memory 4 a connection for a word width of m bits leads to a first input 55 of a fourth multiplexer stage 6. A second input 56 of the fourth multiplexer stage 6 is connected, via a connection with a word width of m bits, to the data output 45 of the memory unit 1. An output 57 of the fourth multiplexer stage 6 is also connected to an input 58 of the second sub-block memory 8 via a connection with a word width of m bits. An output 59 of the second sub-block memory 8 is connected, via a connection with a word width of m bits, to the second input 23 of the multiplier stage 9.

For the control of the data processing steps to be performed by the described arrangement there is provided the control unit 18 which is connected, via control lines 60 to 65, to the output register 5, the first intermediate result memory 3, the reduction polynomial memory 4, the first sub-block memory 7, the second sub-block memory 8 and the second intermediate result memory 16. Via the control lines 60 to 65 control commands are applied to said stages. The control unit 18 is also connected, via a respective control line 66 to 69, to the third multiplexer stage 2, the fourth multiplexer stage 6, the first multiplexer stage 14 and the second multiplexer stage 15. Via the control lines 66 to 69, the multiplexer stages 2, 6, 14 and 15 receive selection signals which determine the optional switching of each time one of the inputs of these multiplexer stages 2, 6, 14 or 15 to its output. Via a command line 70 the control unit 18 is connected to a central processing unit 20. Via this command line 70 the central processor unit 20 can give a command for independent execution of the multiplication to the control unit 18. Moreover, via the command line 70 the control unit 18 can apply status information to the central processor unit 20, e.g. a ready message after completion of the multiplication.

The first intermediate result memory 3 is designed to store both intermediate results of p sub-blocks in a section of the intermediate result memory 3 which is shown symbolically in FIG. 1 and marked $Z(j)$ and to store three further data words or sub-blocks which are also stored in the sections of the intermediate result memory 3 which are shown symbolically in FIG. 1 and marked T, XI and C1. The significance of these sub-blocks for the polynomial multiplication to be performed will be described below.

From the first intermediate result memory 3 each time one of the sub-blocks $Z(j)$, T, XI or C1 stored therein is output, via the output 50, in a word width of m bits and applied both to the first sub-block memory 7, at its input 53, and to the first exclusive-OR link stage 12 at its third input 28. In the first sub-block memory 7 the supplied sub-block is prepared as described for linking in the multiplier stage 9. The connection described from the output 54 of the first sub-block memory 7 to the first input 22 of multiplier stage 9 with word width of m bits is used to apply the sub-block to the multiplier stage 9.

The memory unit 1 is designed as a register, preferably as RAM, with a memory space of at least $(2p+r)*m$ bits. Therein, p is the number of sub-blocks, each with a width of m bits which form the vector which can be represented by each of the factors to be multiplied from the Galois field GF ($2^{m*p}$) and p, m are positive integers greater than 1. Figure r is the number of the least-significant sub-blocks of the reduction polynomial which each comprise m bits, arbitrarily not equal to the zero vector, where r is a positive integer less than p. The first intermediate result memory 3 is also designed as a register which has a memory space of $(p+3)*m$ bits, where each time m bits are provided for the sections as marked T, XI or C1 of intermediate result memory 3 and the section $Z(j)$ comprises a memory space of $p*m$ bits. The reduction polynomial memory 4 is formed by a register with a memory space of $r*m$ bits. The output register 5, the first and second sub-block memories 7 and 8 and the second intermediate result memory 16 are formed by a respective register with a memory space of m bits.

The core of the multiplier according to the invention is formed by the m*m bit multiplier stage 9. Using of this m*m-bit multiplier stage 9, for complete multiplication of the two factors X and Y in total p*p contributions are formed as products of sub-blocks X(i) and Y(j) in the form $X(i)*Y(j)$ which are accumulated by means of an exclusive-OR function by the exclusive-OR link stages 12, 13 which are used as adders for the polynomial multiplication to be performed.

The function of the circuit arrangement in FIG. 1 is as follows. The central processor unit 20 writes the two factors X and Y to be multiplied and said reduction polynomial R in the memory unit 1. The reduction polynomial R comprises a leading bit other than zero and p subsequent sub-blocks R(p), R(p−1), . . . , R(1) of m bits each; the R least-significant blocks R(r), R(r−1), . . . , R(1) thereof, with m bits each, arbitrarily not equal to the zero vector, and the other sub-blocks R(p), R(p−1), . . . , R(r+1), R(r) are selected as zero, r being a positive integer less than p. After this write process the following sub-blocks will be present in the memory unit 1: X(p), X(p−1), X(2), X(1); Y(p), Y(p−1),, . . . , Y(2), Y(1); R(r), R(r−1), . . . , R(2), R(1), with r less than p and greater than or equal to 1. For the subsequent data processing procedures these sub-blocks can be read directly by the polynomial multiplier, i.e. by direct memory access (DMA), from the memory unit 1. Via the command line 70 between the control unit 18 and the central processor unit 20, to activate the polynomial multiplier a command is given to the control unit 18 for independent execution of the multiplication.

Controlled by the control unit 18, in the polynomial multiplier according to FIG. 1 the r sub-blocks R(r), R(r−1), . . . , R(2), R(1) of the reduction polynomial R are first loaded in the reduction polynomial memory 4. Whereas the entire actual reduction polynomial R always has a width of n+1 bits, only a section thereof is stored in the memory unit 1 and in the reduction polynomial memory 4, that is, the r sub-blocks R(r), R(r−1),. . . , R(2), R(1) different from the zero vector. To this end, a leading "1" is assumed by the polynomial multiplier, but this leading (n+1)th bit point is not stored explicitly in the memory unit 1 or in the reduction polynomial memory 4. As stated above, the number r of sub-blocks to be taken into account by the reduction polynomial R, that is, its r sub-blocks R(r), R(+1), R(2), R(1) different from the zero vector, is less than the number p of sub-blocks X(i) or Y(j) of the factors X and Y to be multiplied. Preferably r=1 or r=2, i.e. only one or two sub-blocks of the reduction polynomial R are taken into account. In the dimensioning example given above, these are the 32 or 64 bits of a total width of (n+1)=193 bits of the reduction polynomial R. The value of the leading (n+1)th bit point is set to "1", and that of the other bit points to "0".

The first intermediate memory 3 stores both the intermediate results of the calculation described below in the section marked Z(j) and three further sub-blocks (also known as "data words") XI, C1 and T in the sections marked XI, C1 and T. These sub-blocks or data words XI, C1 and T are used in the reduction of the multiplication result. At the start of the process of multiplication of the factors X and Y, the first intermediate result memory 3 is initialized to "0" i.e. all values stored in its sections are set to "0".

A run index i for running through all sub-blocks X(i) of factor X to be multiplied by one another in the m*m-bit multiplier stage 9 is set initially to the value p:

i := p.

Starting from the initial situation defined above, now a number p of runs is performed with the following calculation steps:

1. load XI:=X(i) from the memory unit 1, via the data output 45 and the third multiplexer stage 2, into the section XI of the first intermediate result memory 3;
2. load XI into the first sub-block memory 7;
3. set j :=p;
4. load Y(j) from the memory unit 1, via the data output 45 and the fourth multiplexer stage 6 into the second sub-block memory 8; MSB and LSB of the multiplication result X(i)*Y(j) of the sub-blocks X(i) and Y(j) of the factors X and Y are then available at the outputs 24, 25 of the m*m-bit multiplier stage 9 for further processing;
5. add the multiplication result X(i)*Y(j) of the sub-blocks X(i) and Y(j) of the factors X and Y to the previous intermediate result Z(j) from the section Z(j) of the first intermediate result memory 3 by accumulating the MSB of the multiplication result X(i)*Y(j) in the section T of the first intermediate result memory 3 and the LSB of the multiplication result X(i)*Y(j) in the second intermediate result memory 16 according to the formula $$[T,C]:=[Z(j), 0]+X(i)*Y(j);$$

here the first exclusive-OR link stage 12 is used as an adder for the MSB and the second exclusive-OR link stage 17 for the LSB, the second intermediate result memory 16 is set and the MSB are passed, via the third multiplexer stage 2, to the first intermediate result memory 3;

6. reduce (decrement) the run index j by 1 according to the formula $$j:=j-1;$$

7. load (j) from the memory unit 1, via the data output 45 and the fourth multiplexer stage 6, into the second sub-block memory 8;
8. if j<r: load XI into the first sub-block memory 7; then the MSB and LSB of the multiplication result X(i)*Y(j) of the sub-blocks X(i) and Y(j) of the factors X and Y are available at the outputs 24, 25 of the m*m-bit multiplier stage 9 for further processing;
9. add the multiplication result X(i)*Y(j) of the sub-blocks X(i) and Y(j) of the factors X and Y to the previous intermediate result Z(j) from the section Z(j) of the first intermediate result memory 3 and the result C (LSB) from the second intermediate result memory 16 by accumulating the MSB of the multiplication result X(i)*Y(j) in the section Z(j+1) or the section C1 of the first intermediate result memory 3 and the LSB of the multiplication result X(i)*Y(j) in the second result memory 16; moreover, for the case where j is less than or equal to r, calculate the product of the first sub-block R(j) of the reduction polynomial R with the sub-block T stored in the section T of the first intermediate result memory 3, add this product to the sub-blocks C1 (MSB) or C (LSB) stored in the section C1 or in the second intermediate result memory 16, respectively, and accumulate the result in the section Z(j+1) of the first intermediate result memory 3 or in the second intermediate result memory 16 (in the case of the sub-block C) according to the formula:

if j>r: $[Z(j+1),C]:=+[Z(j)+C,0]+X(i)*Y(j);$ if j<r or j=r: $[C1,C]:=[Z(j)+C,0]+X(i)*Y(j)$ and $[Z(j+1),C]:=[C1,C]+T*R(j);$ here the first exclusive-OR link stage 12 is used as an adder for the MSB and the second exclusive-OR link stage 17 for the LSB, the second intermediate result memory 16 is set, the MSB are applied, via the third multiplexer stage 2, to the first intermediate result memory 3 and therein set the sections Z(j+1) and C1; to calculate the product T*R(j), R(j) is passed from the reduction polynomial memory 4, via the fourth multiplexer stage 6, to the second sub-block memory 8, while the sub-block T is loaded from the corresponding section T of the first intermediate result memory 3 into the first sub-block memory 7; this calculation step, therefore, involves, as well as the m*m-bit multiplier stage 9, the first and second exclusive-OR link stages 12 and 13, the first, second, third and fourth multiplexer stages 14, 15, 2 and 6, and the second intermediate result memory 16;

10. reduce ("decrement") the run index j by 1 according to the formula $$j:=j-1;$$

if j>0, proceed with calculation step 7;

11. store the result value C from the second intermediate result memory 16 into the section Z(1) of the first intermediate result memory 3 according to the formula $$Z(1):=C;$$

12. reduce ("decrement") the run index i by 1 according to formula $$i:=i-1;$$

if i>1, proceed with calculation step 1;

13. now for the run index i the following relation applies $$i=1.$$

The last run through the above calculation steps 1 to 12 is started where each newly calculated value of the total of p sub-blocks Z(j)) is part of the desired reduced end result of the polynomial multiplication; these sub-blocks Z(j), as well as the calculation operations described for the steps 1 to 12, are passed by direct memory access (DMA), via the output register 5, to the data input of the memory unit 1 and stored therein at the predetermined memory locations.

The embodiment of FIG. 1 utilizes in the calculation step 9 as described a memory section referred to as a section C1 of the first intermediate result memory 3. In the embodiment shown in FIG. 2, which forms a derivation of the first embodiment, the sub-block C1 is stored not in a section of the first intermediate result memory 3, but in a separate register known as the third intermediate result memory 19 with a memory space of m bits. The correspondingly derived first intermediate result memory, reduced in particular by the section for storing the sub-block C1, is marked in FIG. 2 by the reference 103; an input 149 of this first intermediate result memory 103 according to the derivation in FIG. 2 replaces, in respect of its connections to the remaining circuitry, the input 49 of the first intermediate result memory 3 in FIG. 1. Correspondingly, an output 150 of the first intermediate result memory 103 according to the derivation in FIG. 2 replaces, in respect of its connections to the remaining circuitry, the output 50 of the first intermediate result memory 3 in FIG. 1.

The third intermediate result memory 19 forms the memory section dimensioned to store the link result C1 output by the first exclusive-OR link stage 12 and has an output 71 which is connected, via a connection designed for a word width of m bits, to the output 37 of the first exclusive-OR link stage 12. Thus, the link result emitted by the first exclusive-OR link stage 12 is applied directly to the input 71 and stored as sub-block C1. An output 72 of this memory section, marked as the third intermediate result memory 19, is connected, via a connection designed for a word width of m bits, to a first input 73 of a fifth multiplexer stage 17 which is connected with a second input 74, via a connection which is also designed for a word width of m bits, to the output 150 of the first intermediate result memory 103. An output 75 of the fifth multiplexer stage 17 is connected, via a connection designed for a word width of m bits, to the third input 28 of the first exclusive-OR link stage 12.

Via the fifth multiplexer stage 17 either the link result supplied by the first exclusive-OR link stage 12 and stored in the third intermediate result memory 19 or another intermediate result from the first intermediate result memory 103 is applied to the first exclusive-OR link stage 12. This is controlled by the control unit 18 via a control line 76, via which corresponding selection signals are transferred by the control unit 18 to the fifth multiplexer stage 17. In a manner similar to the control of the second intermediate result memory 16, further memory commands are applied by the control unit 18, via a control line 77, to the third intermediate result memory 19 to control the storage of the sub-block C1.

Evidently, the second and third intermediate result memories 16, 19 can be combined into a register with a width of 2 m bits in which both sub-blocks C and C1 have space.

The invention has the advantage that because of the use of the first intermediate result memory (element 3 or 103 in the embodiments shown in the FIGS. 1 and 2) and the reduction polynomial memory (element 4 in the embodiments shown in the FIGS. 1 and 2), memory access to the memory unit 1 is restricted to a minimum. This firstly has favorable effects on the power consumption of the multiplier and secondly gives a considerable acceleration of the entire calculation process, as access to a memory unit formed as a RAM (element 1 in the embodiments shown in the FIGS. 1 and 2) is always time-consuming and hence constitutes a bottleneck in the execution of the multiplication.

The invention also utilizes the knowledge that in conventional reduction polynomials (element 3 or 103 in the embodiments shown in the FIGS. 1 and 2) very many zeros follow a "1" at the point of the leading (n+1)th) bit. This is advantageously utilized by the invention as only a number r of a total of p sub-blocks is stored and taken into account in the calculation steps to be performed. The saving of storage operations and calculation steps has a favorable effect both on the power consumption and on the calculation time. In addition the multiplier according to the invention can be reduced in size because of these savings, so that in an arrangement such as an integrated circuit on a semiconductor crystal, crystal surface can be saved.

The multiplier according to the invention can also be constructed with simple register circuits instead of shift registers. The multiplier according to the invention and the method according to the invention are also designed so that in each of the calculation steps as described for the embodiment of FIG. 1 the intermediate results Z(j) are never all changed at the same time. As a result not only are peaks in power consumption of the circuit arrangement of the multiplier avoided but the total power consumption can be kept low. In particular in products for identification, e.g. chip cards and the like, this firstly improves the energy balance and secondly increases the resistance to interference and the protection against disclosure of confidential data.

LIST OF REFERENCES

1 Memory unit as a register, preferably as a RAM, with a memory space of at least (2p+r)*m bits

2 Third multiplexer stage

3 First intermediate result memory according to FIG. 1, designed as a register with a memory space of (p+3)*m bits, where m bits are provided for each of the sections marked T, XI or C1 of the intermediate result memory 3 and the section Z(j) covers a memory space of p*m bits 4 Reduction polynomial memory designed as a register with a memory space of r*m bits 5 Output register for intermediate storage of a link result, designed as a register with a memory space of m bits 6 Fourth multiplexer stage 7 First sub-block memory for storage and provision of the sub-blocks of word width m to be linked to one another in the multiplier stage 9, designed as a register with a memory space of m bits 8 Second sub-block memory for storage and provision of sub-blocks of word width m to be linked to one another in the multiplier stage 9, designed as a register with a memory space of m bits 9 m*m-bit multiplier stage 10 Line for the more-significant bits MSB between the first output 24 of multiplier stage 9 and the first input 26 of the first exclusive-OR link stage 12

11 Line for the less-significant bits LSB between the first output 25 of the multiplier stage 9 and the first input 29 of the first exclusive-OR link stage 12

12 First exclusive-OR link stage used as an adder for the polynomial multiplication to be performed 13 Second exclusive-OR link stage used as an adder for the polynomial multiplication to be performed 14 First multiplexer stage 15 Second multiplexer stage 16 Second intermediate result memory designed as a register with a memory space of m bits 17 Fifth multiplexer stage 18 Control unit to control the multiplier according to a predetermined functional of sequence 19 Third intermediate result memory for the storage of the sub-block C1, designed as a separate register with a memory space of m bits 20 Central processor, also referred to as CPU 21 Connection between the memory unit 1 and the central processor unit 20

22 First input of the multiplier stage with word width m

23 Second input of the multiplier stage with word width m

24 First output of the multiplier stage 9 for the more-significant bits MSB with word width m 25 Second output of the multiplier stage 9 for the less-significant bits MSB with word width m 26 First input of the first exclusive-OR link stage 12

27 Second input of the first exclusive-OR link stage 12

28 Third input of the first exclusive-OR link stage 12

29 First input of the second exclusive-OR link stage 12

30 Second input of the second exclusive-OR link stage 12

31 First input of the first multiplexer stage 14

32 Second input of the first multiplexer stage 14 for the supply of a zero vector 33 Output of the first multiplexer stage 14

34 First input of the second multiplexer stage 15

35 Second input of the second multiplexer stage 15 for the supply of a zero vector 36 Output of the second multiplexer stage 15

37 Output of the first exclusive-OR link stage 12

38 Output of the second exclusive-OR link stage 12

39 Input of the second intermediate result memory 16

40 Output of the second intermediate result memory 16

41 First input of the third multiplexer stage 2

42 Second input of the third multiplexer stage 2

43 Third input of the third multiplexer stage 2

44 Output of third multiplexer stage 2

45 Data output of the memory unit 1

46 Data input of the memory unit 1

47 Input of the output register 5

48 Output of the output register 5

49 Input of the first intermediate result memory 3

50 Output of the first intermediate result memory 3

51 Input of the reduction polynomial memory 4

52 Output of the reduction polynomial memory 4

53 Input of the first sub-block memory 7

54 Output of the first sub-block memory 7

56 First input of the fourth multiplexer stage 6

57 Second input of the fourth multiplexer stage 6

58 Output of the fourth multiplexer stage 6

59 Input of the second sub-block memory 8

60 Output of the second sub-block memory 8

61 Control line for memory commands between the control unit 18 and the output register 5

62 Control line for memory commands between the control unit 18 and the first intermediate result memory 3

63 Control line for memory commands between the control unit 18 and the reduction polynomial memory 4

64 Control line for memory commands between the control unit 18 and the first sub-block memory 7

65 Control line for memory commands between the control unit 18 and the second sub-block memory 8

66 Control line for memory commands between the control unit 18 and the second intermediate result memory 16

67 Control line for selection signals between the control unit 18 and the third multiplexer stage 2

68 Control line for selection signals between the control unit 18 and the fourth multiplexer stage 6

69 Control line for selection signals between the control unit 18 and the first multiplexer stage 14

70 Control line for selection signals between the control unit 18 and the second multiplexer stage 15

71 Command line between the control unit 18 and the central processing unit 20 for e.g. a command for independent execution of multiplication to the control unit 18 or status information to the central processor unit 20

71 Input of the third intermediate result memory 19

72 Output of the third intermediate result memory 19

73 First input of the fifth multiplexer stage 17

74 Second input of the fifth multiplexer stage 17

75 Output of the fifth multiplexer stage 17

76 Control line for selection signals between the control unit 18 and the fifth multiplexer stage 17

77 Control line for storage commands between the control unit 18 and the third intermediate result memory 19

103 First intermediate result memory according to FIG. 2; reduced in relation to the first intermediate memory 3 in FIG. 1 by the section for the storage of the sub-block C1, i.e. designed as a register with a memory space of (p+2)*m bits, where m bits are provided for each of the sections marked T and XI of the intermediate result memory 103 and the section Z(j) comprises a memory space of p*m bits 149 Input of the first intermediate result memory 103 according to FIG. 2

150 Output of the first intermediate result memory 103 according to FIG. 2

C Sub-block stored in the second intermediate result memory 16

C1 Section of the first intermediate result memory 3; sub-block stored therein or in the third intermediate result memory 19
i Run index; i=1, . . . , p
j Run index; j=1, . . . , p
LSB Less-significant bits
m Width of each of the p sub-blocks forming the vector as can be formed by each of the factors to be multiplied from the Galois field GF ($2^{m*p}$); m is a positive integer greater than 1
MSB More-significant bits
n Width of the factors to be multiplied from the Galois field GF ($2^{m*p}$); product of the parameters p and m
p Number of sub-blocks, each having a width of m bits forming the vector as can be formed by each of the factors to be multiplied from the Galois field GF ($2^{m*p}$); p is a positive integer greater than 1
r Number of the least-significant sub-blocks of the reduction polynomial R, which each comprise m bits arbitrarily not equal to the zero vector; r is a positive integer less than p
R Reduction polynomial
T section of the first intermediate result memory 3; sub-block stored therein
X Factor to be multiplied by Y
X(i) Sub-blocks of the factor X, each having a width of m bits and i=1, . . . , p
XI Section of the first intermediate result memory 3; sub-block stored therein
Y Factor to be multiplied by X
Y(j) Sub-blocks of the factors Y, each having a width of m bits and j=1, . . . , p
Z(j) Section of the first intermediate result memory 3; sub-block stored therein

The invention claimed is:

1. A multiplier according to the invention for multiplying two factors from the Galois field GF ($2^{m*p}$), where each of the factors can be represented as a vector of p sub-blocks with a width of m bits and p, m are positive integers greater than 1, characterized in that it comprises:
   a memory unit for storing the factors to be multiplied of the r least-significant sub-blocks of a reduction polynomial which each comprise m bits, where r is a positive integer less than p, and a reduced final result of the multiplication of the factors,
   an m*m-bit multiplier stage for multiplicative linking of each time two of the sub blocks of the factors and for output of a multiplication result with a width of 2m bits,
   a first and a second sub-block memory for storage and provision of each time one of the sub-blocks to be linked multiplicatively,
   a first intermediate result memory for storing at least one intermediate result,
   a first exclusive-OR link stage for linking the m most-significant bits of each multiplication result according to an exclusive-OR function with a digit-aligned selected intermediate result from the first intermediate result memory and with an element selected via a first multiplexer stage,
   a second exclusive-OR link stage for linking the m least-significant bits of each multiplication result according to an exclusive-OR function with an element selected via a second multiplexer stage,
   a second intermediate result memory for storing a link result output by the second exclusive-OR link stage,
   a reduction polynomial memory for storing and provision of the r least-significant sub-blocks of the reduction polynomial,
   an output register for temporary storage of one of the link results output by the first or the second exclusive-OR link stage as a sub-block of the reduced end result of the multiplication of the factors to be applied to the memory unit,
   a third multiplexer stage for applying the link result output by the first or the second exclusive-OR link stage or a selected sub-block from the memory unit optionally to the reduction polynomial memory, to the first intermediate result memory or to the output register,
   a fourth multiplexer stage for optional supply of a sub-block of the reduction polynomial from the reduction polynomial memory or a sub-block of the second factor from the memory unit to the second sub-block memory,
   and a control unit to control the said components of the multiplier according to a prespecified functional sequence,
   where the first multiplexer stage and the second multiplexer stage each select between the current link result of the second intermediate result memory and a zero vector of the same width.

2. A multiplier as claimed in claim 1, characterized in that an input of a memory section dimensioned for the link result output by the first exclusive-OR link stage is connected directly to an output of the first exclusive-OR link stage and an output of this memory section is connected to an input of a fifth multiplexer stage via which optionally the link result output by the first exclusive-OR link stage or another intermediate result from the first intermediate result memory is applied to the first exclusive-OR link stage.

* * * * *